United States Patent [19]

Kurosawa et al.

[11] Patent Number: 5,032,942
[45] Date of Patent: Jul. 16, 1991

[54] MAGNETIC HEAD ADJUSTING DEVICE

[75] Inventors: Yuichi Kurosawa; Tahei Morisawa; Harumi Aoki, all of Tokyo, Japan

[73] Assignee: Asahi Kogaku Kogyo K.K., Tokyo, Japan

[21] Appl. No.: 328,386

[22] Filed: Mar. 24, 1989

Related U.S. Application Data

[62] Division of Ser. No. 73,662, Jul. 15, 1987, Pat. No. 4,835,646.

[30] Foreign Application Priority Data

Jul. 15, 1986 [JP] Japan .............................. 61-166093
Mar. 11, 1987 [JP] Japan .............................. 62-56289

[51] Int. Cl.$^5$ .............................................. G11B 5/56
[52] U.S. Cl. ................................. 360/109; 360/106
[58] Field of Search ............................. 360/109, 106

[56]  References Cited

U.S. PATENT DOCUMENTS 3,943,569  3/1976  Bettini ............................ 360/109
4,562,501  12/1985  Cantwell ........................ 360/109

Primary Examiner—A. J. Heinz
Attorney, Agent, or Firm—Sughrue, Mion, Zinn Macpeak & Seas

[57]  ABSTRACT

A magnetic head adjuster is disclosed for adjusting the positional relation between a magnetic disk and a magnetic head for recording or reproducing information on or from the disk. The magnetic head is secured to a plate spring having at least three support arms located around the magnetic head. The plate spring is supported on a carrier so that the distance between the carrier and each of the three support arms can be adjusted.

2 Claims, 7 Drawing Sheets

MAGNETIC HEAD ADJUSTING DEVICE

BACKGROUND OF THE INVENTION

This is a division of application Ser. No. 073,662 filed July 15, 1987, now U.S. Pat. No. 4,835,646.

The present invention relates to a magnetic recorder for recording or reproducing information on or from a magnetic disk, and more particularly to a magnetic head adjuster for adjusting the positional relation between the magnetic head and the magnetic disk.

In an electronic still camera in which a video signal obtained from a photoelectric conversion element such as a solid image pickup element is recorded on a magnetic disk and reproduced therefrom, a recorded signal including the video signal is required to be recorded at a high density on a magnetic disk rotating at a high speed, unlike a conventional 3.5-inch floppy disk drive system. To perform high-density recording, it is necessary for the magnetic head to be accurately placed at the track of the magnetic disk and the positional relation between the head and the disk always kept precise. For that reason, the allowable error in the azimuth of the magnetic head is prescribed to be 6 minutes or less for the electronic still camera, and other adjusted quantities are also required to be accurate.

The magnetic head of a conventional magnetic recording/reproduction device can be finely adjusted in all directions to attain such high accuracy as described above. However, there are problems that the number of the component parts of the device increases, the constitution thereof becomes more complicated and adjustment work becomes more troublesome and difficult according as the adjustment of the position of the magnetic head is made more accurate.

There are other problems that the quantity of adjustment in a direction is adversely affected by adjustment in another direction, and quantity of adjustment is changed due to a displacement resulting from the rotation of a screw or due to a strain resulting from tightening torque applied to the screw to perform securing after the adjustment.

SUMMARY OF THE INVENTION

The present invention was made in order to solve the above-mentioned problems.

Accordingly, it is an object of the present invention to provide a magnetic head adjuster by which sideward inclination and forward or backward inclination, which would be most difficult to adjust of all adjusted quantities, can be adjusted through a simple constitution; and the quantity of adjustment is not adversely affected by other adjustment.

As a result of a study on the fact that a plate spring to which a magnetic head was secured was supported by a carrier, it was found out that sideward inclination and forward or backward inclination could be simply adjusted if the plate spring and the carrier were coupled to each other by three support arms. The present invention was thus achieved.

The present invention is characterized in that the magnetic head is secured to the plate spring having the three support arms located around the magnetic head; and the plate spring is supported on the carrier so that the distance between the carrier and each of the three support arms can be adjusted.

According to the constitution of the present invention, the sideward inclination and the forward or backward inclination can be adjusted by the adjustment of both the distance between the carrier and each of the three support arms of the plate spring and the elastic deformation of the plate spring, which results from the adjustment of the distance. Besides, a projection quantity adjusting member is caused to act to the bottom of the magnetic head securing portion of the plate spring to push and displace the portion. As a result, the quantity of projection of the magnetic head toward a magnetic disk can be also adjusted easily.

According to another aspect of the invention, the height, sideward inclination and forward or backward inclination of the magnetic head could be easily adjusted if the plate spring and the carrier were coupled to each other by at least three support arms and a projection quantity adjusting member was caused to act to the bottom of the magnetic head securing portion of the plate spring. The carrier comprised two members whose positions could be mutually independently adjusted in a straight direction and a rotative direction on a plane parallel with a magnetic disk, to facilitate the adjustment of the position of the magnetic head in all necessary directions. The present invention was thus achieved.

In the magnetic head adjuster provided in accordance with the present invention to adjust the positional relation between the magnetic disk and the magnetic head for recording or reproducing information on or from the magnetic disk, the magnetic head is secured to the plate spring having at least three support arms located around the magnetic head; the support arms are supported on a carrier so that the distance between the carrier and each of the support arms can be adjusted: the projection quantity adjusting member, which is placed in contact with the bottom of the magnetic head securing portion of the plate spring to push and displace the portion toward the magnetic disk, is provided at the carrier; and the carrier comprises a first adjusting member which supports the support arms of the plate spring and can be rotated for adjustment in a plane parallel with the surface of the magnetic disk about an axis extending nearly through the center of the magnetic head and a second adjusting member which supports the first adjusting member and can be moved for adjustment in the tangential direction of the track of the magnetic disk.

DESCRIPTION OF THE PREFERRED EMBODIMENTS

An embodiment of the present invention is hereafter described with reference to the drawings attached hereto.

Figure 1:
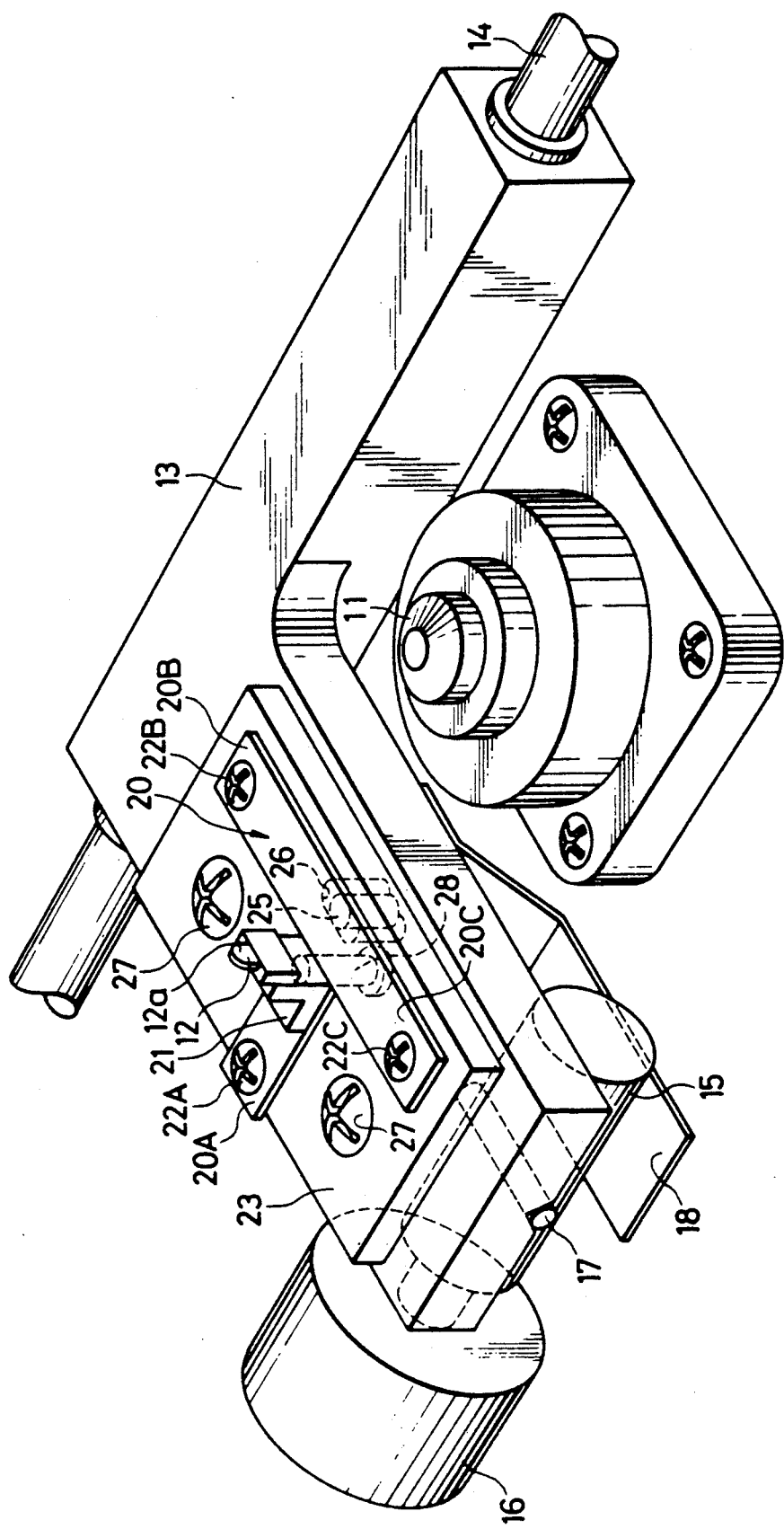
FIG. 1 shows a perspective view of a major part of a magnetic recording/reproduction device having a magnetic head adjuster which is a first embodiment of the present invention.

FIG. 1 shows a perspective view of a major part of a magnetic recording/reproduction device having a magnetic head adjuster which is the embodiment. A magnetic disk not shown in the drawings is supported and rotated by a spindle motor 11. A carriage 13 supporting a magnetic head 12 is movably supported by a guide bar 14 at a side of the spindle motor 11 so that the magnetic head is moved in the radial direction of the magnetic disk when the carriage is moved along the guide bar.

A lead screw 15 is disposed in parallel with the guide bar 14 so that the lead screw is rotated by a stepping motor 16 provided at one end of the lead screw.

A needle 17 is secured to the carriage 13 and engaged with the lead screw 15. A plate spring 18 ensures the engagement of the lead screw 15 and the needle 17 and prevents the carriage 13 from rotating about the guide bar 14.

When the lead screw 15 is rotated by the stepping motor 16, the carriage 13 is moved along the guide bar 14 through the action of the needle 17 so that the magnetic head 12 performs tracking in the radial direction of the magnetic disk.

Figure 5:
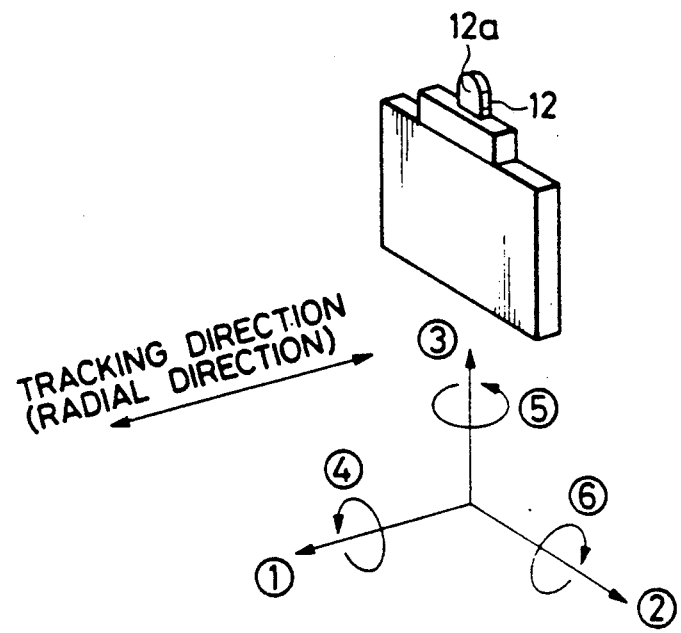
FIG. 5 shows a perspective view for describing the adjusted quantities of the magnetic head.

Since the magnetic head 12 can be moved in six degrees ①, ②, ③, ④, ⑤ and ⑥ of freedom (six directions or six quantities) as shown in FIG. 5, the position of the magnetic head needs to be adjusted when the magnetic head 12 is attached to the carriage 13, which is moved as described above. Since the direction ① of the adjustment is the same as that of tracking of the magnetic disk by the magnetic head 12, the adjustment in the direction ① can be performed by altering the position of the engagement of the lead screw 15 and the needle 17 or by rotating the lead screw 15. As for the magnetic head adjuster, the position of the magnetic head 12 is adjusted in the other five quantities ②, ③, ④, ⑤ and ⑥ which are the movement ② of the center of the magnetic gap 12a of the magnetic head 12, the projection 3 of the magnetic head, the sideward inclination ④ of the magnetic head, the azimuth ⑤ of the magnetic head and the forward or backward inclination ⑥ of the magnetic head. According to the present invention, the sideward inclination ④ and the forward or backward inclination 6 among the other quantities can be simply adjusted. The magnetic head adjuster has mechanisms for adjusting all the quantities ①, ②, ③, ④, ⑤ and ⑥.

The magnetic head adjuster according to the first embodiment is now described with reference to FIGS. ①, ②, ③ and ④. The magnetic head 12 is secured with a head holder 21 to the center of a T-shaped plate spring 20 whose central portion is higher than both the end portions thereof. The plate spring 20 has three support arms 20A, 20B and 20C extending away from the magnetic head 12. The support arm 20A extends in the longitudinal direction of the magnetic gap 12a. The other support arms 20B and 20C extend perpendicularly to the longitudinal direction of the magnetic gap 12a.

Support screws 22A, 22B and 22C are provided at the tips of the support arms 20A 20B and 20C. The heads of the support screws 22A, 22B and 22C are always in intimate contact with the support arms 20A, 20B and 20C. The threaded portions of the support screws are engaged in an adjusting plate 23 on the carriage 13 so that the distances between the adjusting plate 23 and the support arms 20A, 20B and 20C of the plate spring 20 can be changed by altering the engaged positions of the support screws 22A, 22B and 22C. The plate spring 20 has such flexiblity and restoring property that the magnetic head 12 secured thereto is rotatably displaced when the heights of the support arms 20A. 20B and 20C are changed by the alteration of the engaged positions of the support screws 22A. 22B and 22C.

Figure 4:
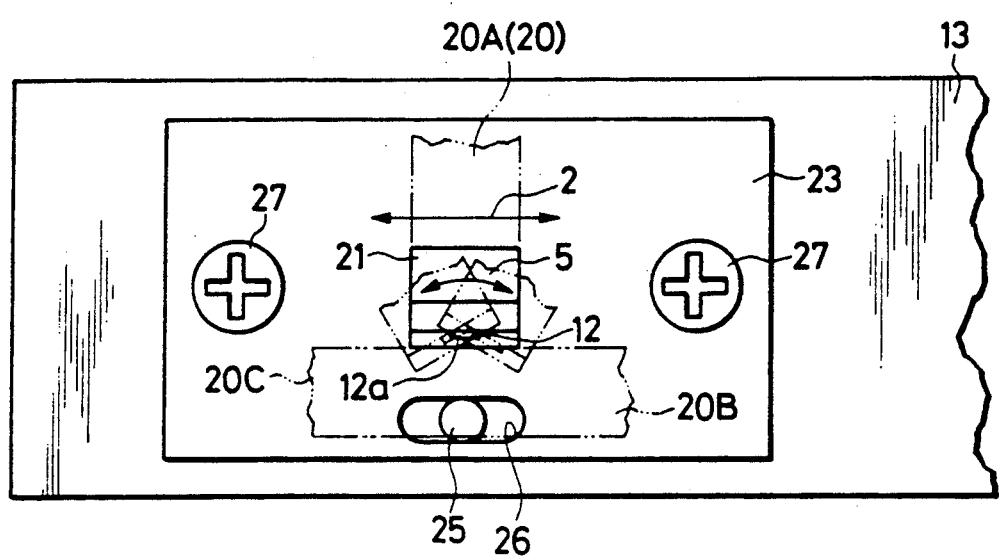
FIG. 4 shows a plan view of the adjusting plate of the magnetic head adjuster shown in FIG. 1.

The adjusting plate 23 and the carriage 13 constitute a carrier. The adjusting plate 23 can be rotated for adjustment in parallel with the magnetic disk and straightly moved for adjustment in the tangential direction of the track of the magnetic disk, relative to the carriage 13. A guide pin 25 is implanted in the carriage 13. The adjusting plate 23 has a slender hole 26 in which the guide pin 25 is fitted so that the adjusting plate 23 can be subjected to the straight motion adjustment in a direction 2 in FIG. 4 and the rotative adjustment in a direction 5 therein, relative to the carriage 13. The directions ② and ⑤ in FIG. 4 are the same as those ② and ⑤ in FIG. 5.

Clearances for enabling the straight motion adjustment and the rotative adjustment are set between securing screws 27 and the inside surfaces of the insertion holes of the adjusting plate 23, through which the securing screws 27 are inserted. After the adjustments are performed the securing screws 27 are tightened to secure the adjusting plate 23 to the carriage 13. The guide pin 25 and the slender hole 26 may be provided in the adjusting plate 23 and the carriage 13, respectively, to produce the above-described effect.

A projection quantity adjusting screws 28, which is located in contact with the plate spring 20 under the magnetic head 12 is engaged in the adjusting plate 23 so that the quantity of projection of the magnetic head 12 toward the magnetic disk can be adjusted in the direction ③ in FIG. 5 by altering the engaged position of the projection quantity adjusting screw 28.

As described above, the adjustment of the magnetic head 12 in the directions 2 and 5 can be performed by altering the position of the adjusting plate 23 relative to the carriage 13. and the adjustment of the magnetic head in the direction 3 can be performed by altering the engaged position of the projection quantity adjusting screw 28. A conventional mechanism not shown in the drawings may be provided to finely displace the adjusting plate 23.

Figure 2:
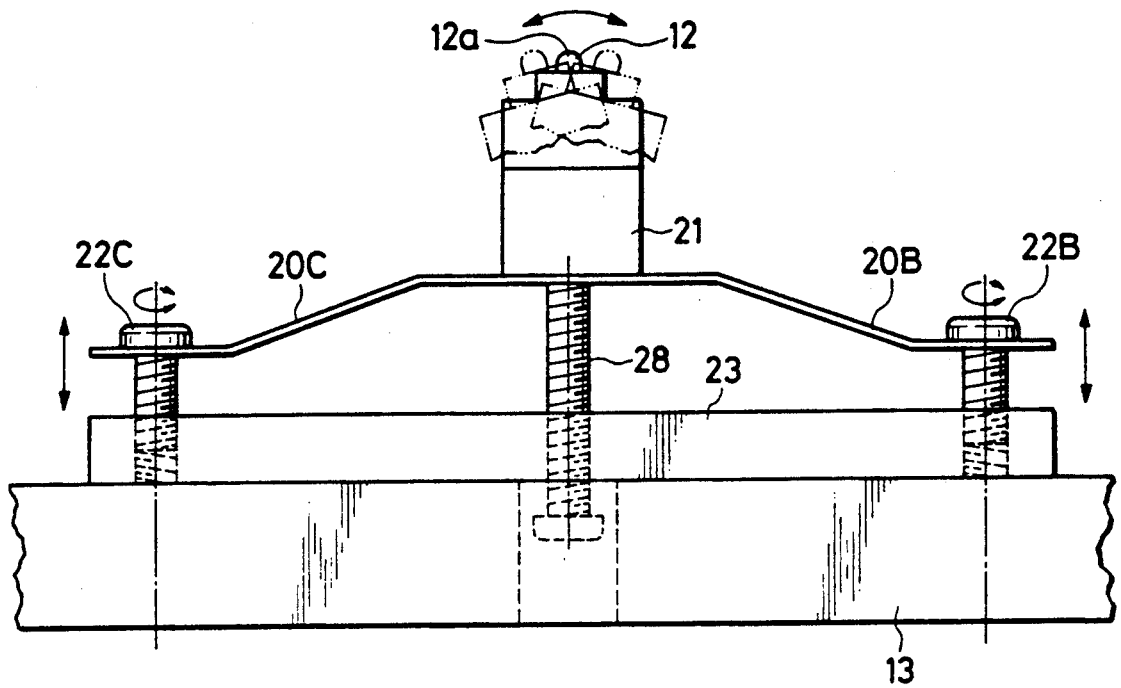
FIG. 2 shows a view of the major part seen in the longitudinal direction of the magnetic gap of the magnetic head shown in FIG. 1.
Figure 3:
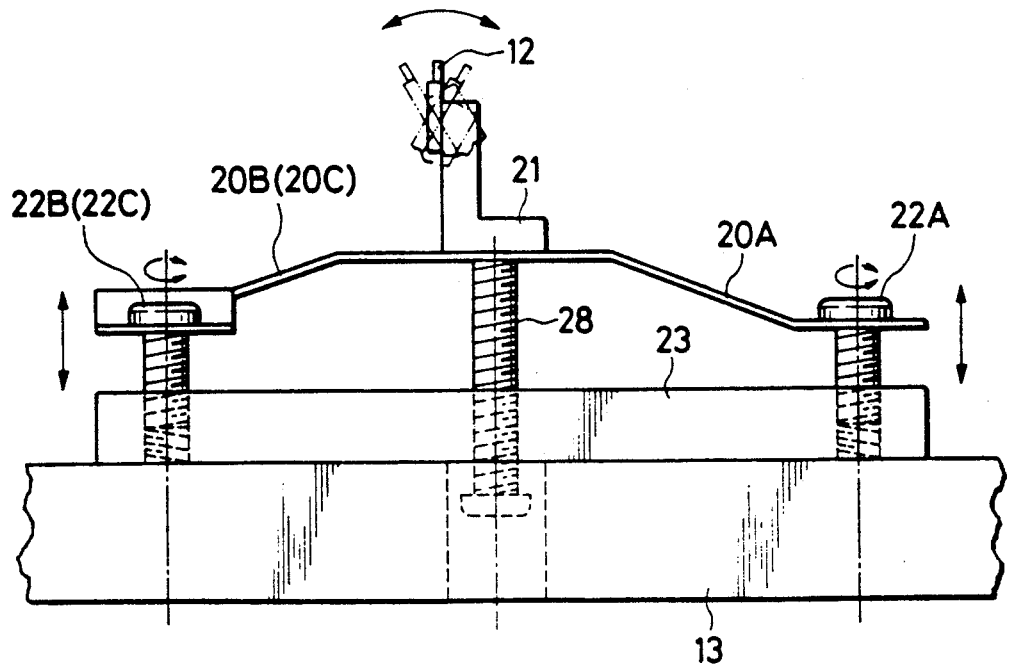
FIG. 3 shows a view of the major part seen in a direction perpendicular to the longitudinal direction of the magnetic gap shown in FIG. 1.

The adjustment of the sideward inclination 4 of the magnetic head 12 and that of the forward or backward inclination 6 thereof, which are features of the present invention, are performed by adjusting the heights of the engaged positions of the support screws 22A. 22B and 22C in the adjusting plate 23. When the heights of the engaged positions of the support screws 22B and 22C in the adjusting plate 23 are changed as shown in FIG. 2, the distance between the adjusting plate and the support arms 20B and 20C are altered to elastically deform the plate spring 20 to subject the magnetic head 12 to the sideward inclination in the direction ④ to adjust the position of the magnetic head in that direction. When the heights of the engaged positions of the support screws 22A and 22B (22C) in the adjusting plate 23 are changed as shown in FIG. 3, the distances between the adjusting plate and the support arm 20A and 20B (20C) are altered to elastically deform the plate spring 20 to subject the magnetic head 12 to the forward or backward inclination in the direction ⑥ to adjust the position of the magnetic head in that direction.

In a conventional magnetic head adjuster for adjusting inclination through the action of three points, the three points are provided on a rigid plate. For that reason, when the height of one of the points is adjusted, the other adjusted quantities are much changed. Therefore, it is very difficult to adjust all the quantities and consequently requires high skillfulness.

In contrast, the sideward inclination and the forward or backward inclination are adjusted by changing the heights of the three support arms 20A. 20B and 20C of the plate spring 20 of flexibility and restoring property in the magnetic head adjuster provided in accordance with the first embodiment of the present invention, as described above. At that time, the plate spring 20 is only little inclined even if the displacement of the support screws 22A, 22B and 22C is large. For that reason, the magnetic head 12 can be finely adjusted.

Figure 6A:
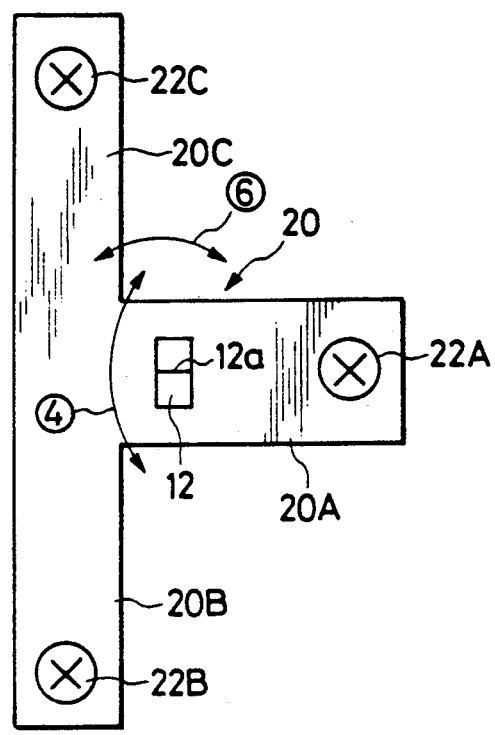
FIGS. 6(A) and 6(B) show mutually different modifications of the first embodiment.
Figure 6B:
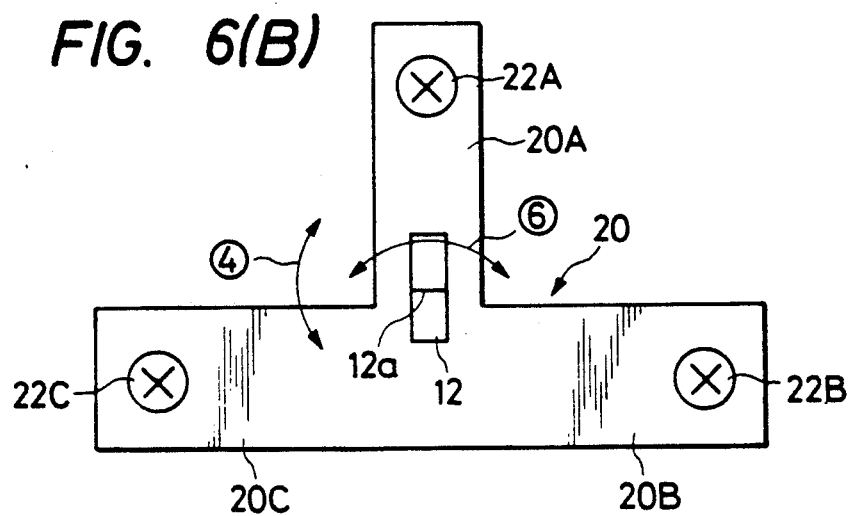

FIGS. 6(A) and 6(B) show plan view of mutually different modifications of the present invention and indicate the relationship between a magnetic head 12 and the three support arms 20A, 20B and 20C of a plate spring 20. Whether two of the three support arms 20A, 20B and 20C extend in the longitudinal direction of the magnetic gap 12a of the magnetic head 12 or extend perpendicularly to the longitudinal direction of the magnetic gap, the same adjusting function is achieved. Degrees of freedom, which are not shown in FIGS. 6(A) and 6(B), exist in the longitudinal directions of the three support arms 20A, 20B and 20C.

Although a magnetic head adjuster provided in accordance with the present invention has such a simple constitution that a magnetic head is secured to a plate spring having three support arms attached to a carrier so that the heights of the arms can be adjusted, as described above, the sideward inclination and forward or backward inclination of the magnetic head can be easily adjusted. The other quantities of the magnetic head can be also easily adjusted because a projection quantity adjusting member and an adjusting plate are provided in the magnetic head adjuster. Therefore, the practical value of the magnetic head adjuster is high.

A second embodiment of the present invention will hereafter be described with reference to FIGS. 7 to 12.

Figure 7:
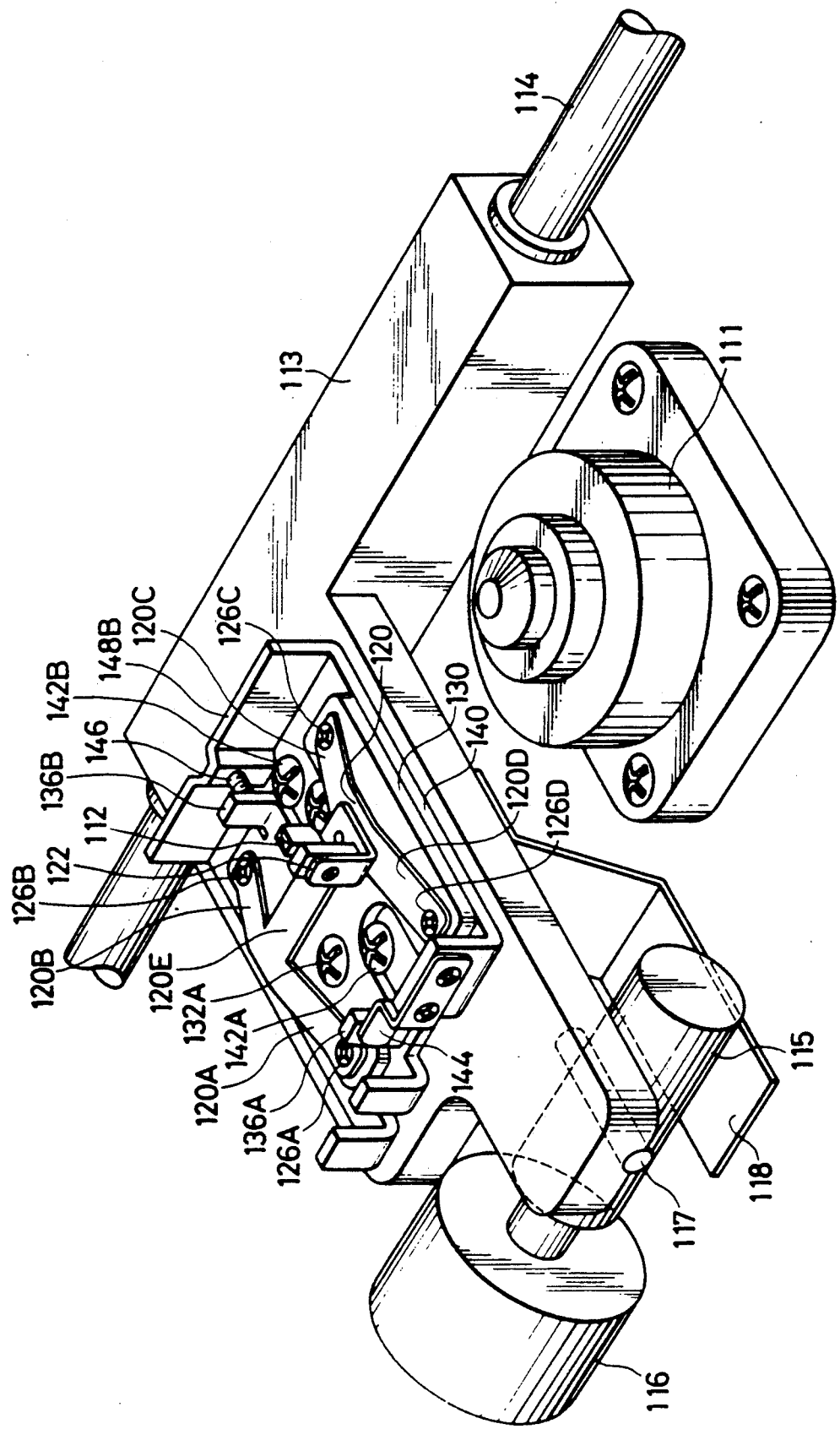
FIG. 7 shows a perspective view of a major part of a magnetic recording/reproduction device having a magnetic head adjuster according to a second embodiment of the present invention.
Figure 8:
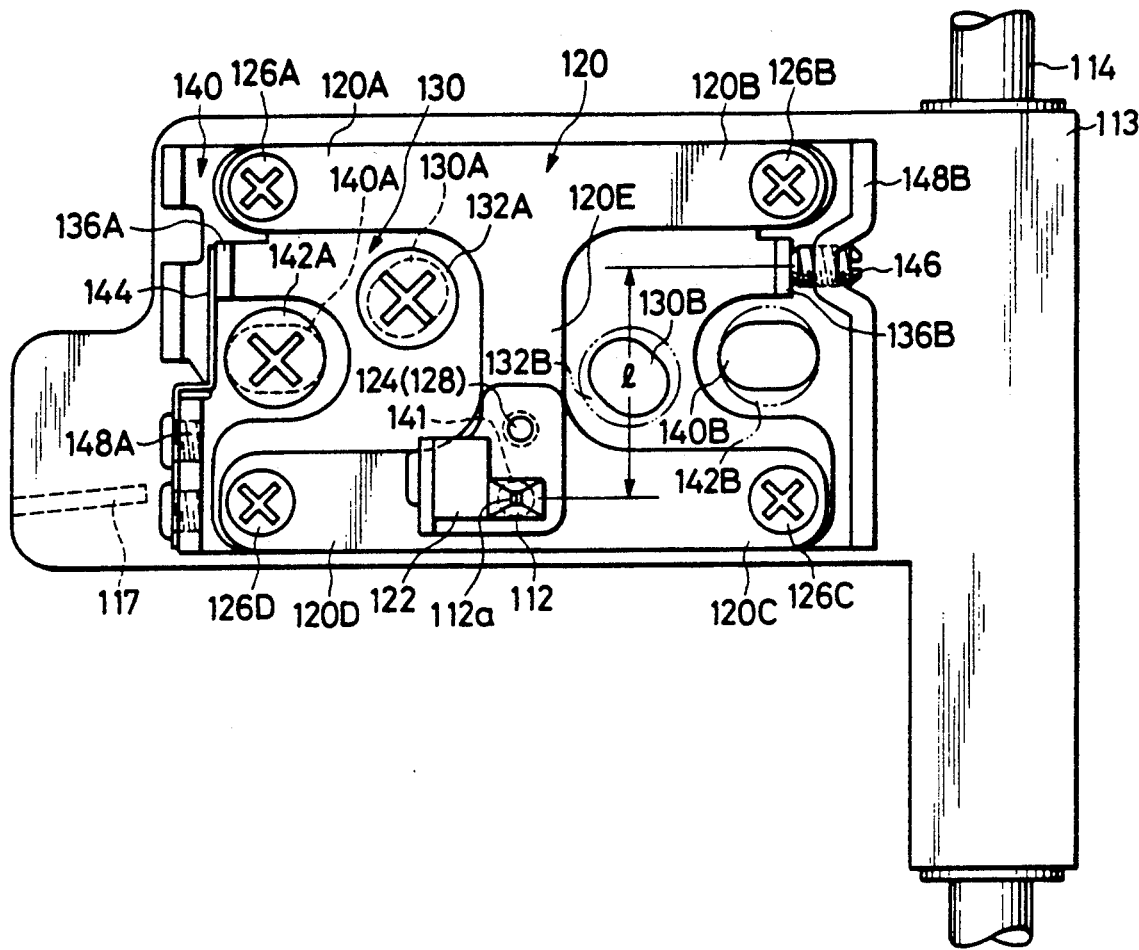
FIG. 8 shows a plan view of the major part of the second embodiment.
Figure 9:
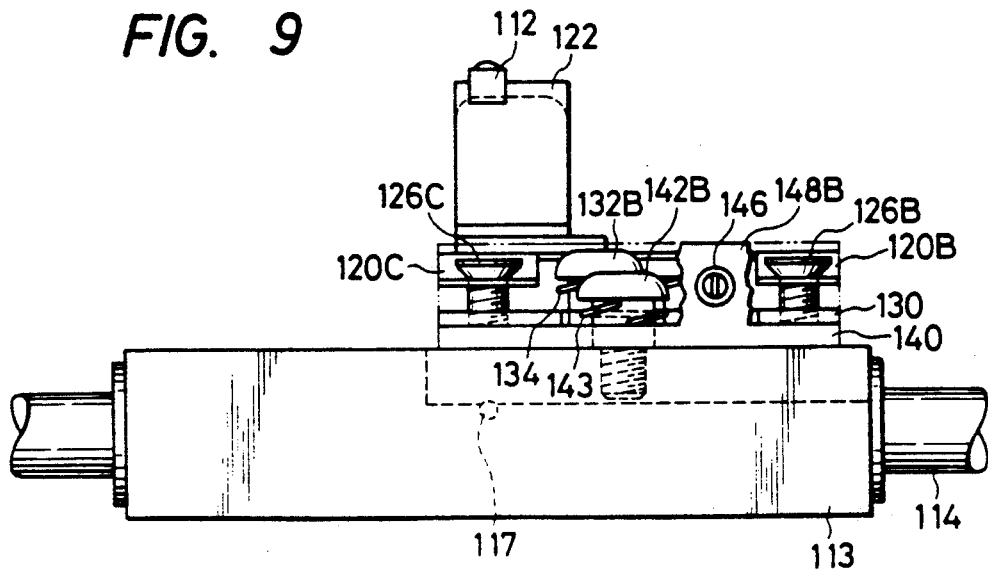
FIG. 9 shows a rear view of the major part seen along an arrow IX shown in FIG. 8.
Figure 10:
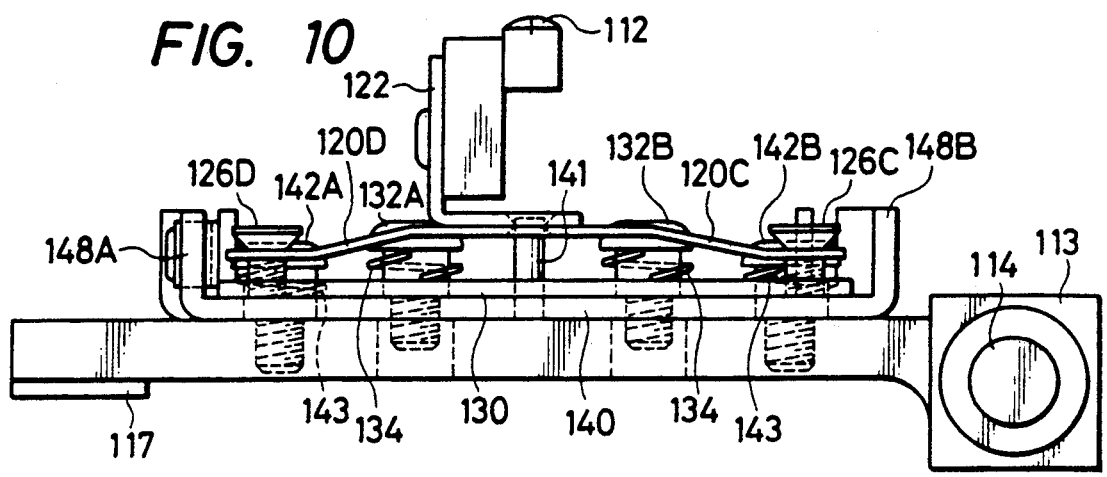
FIG. 10 shows a side view of the major part seen along an arrow X shown in FIG. 8.
Figure 11:
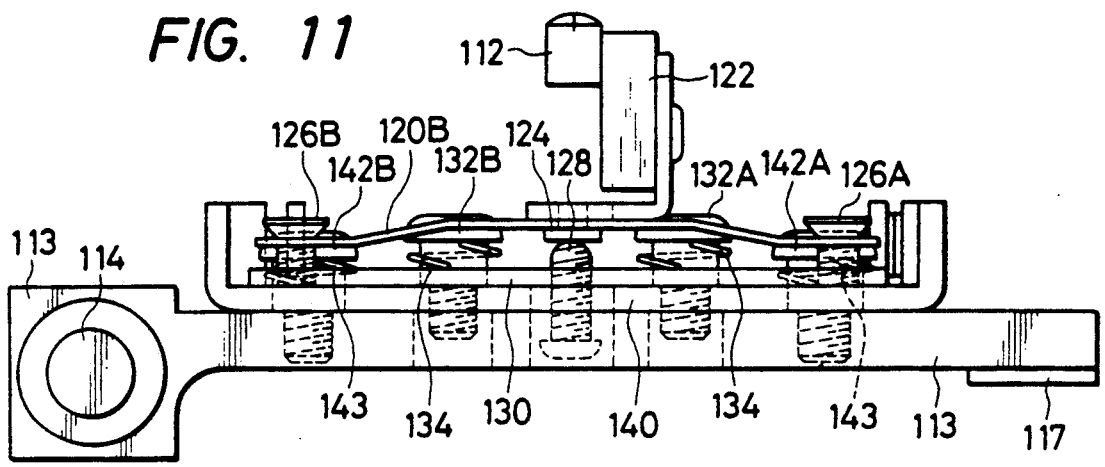
FIG. 11 shows a side view of the major part seen along an arrow XI shown in FIG. 8.

FIG. 7 shows a perspective view of a major part of a magnetic recording/reproduction device having a magnetic head adjuster which is the embodiment. A magnetic disk not shown in FIG. 7 is supported and rotated by a spindle motor 111. A carriage 113 supporting a magnetic head 112 is movably supported on a guide bar 114 at a side of the spindle motor 111 so that the magnetic head is moved in the radial direction of the magnetic disk when the carriage is moved along the guide bar as in the first embodiment.

A lead screw 115 is disposed in parallel with the guide bar 114 so that the lead screw is rotated by a step motor 116 provided at one of the lead screw. A needle 117 is secured to the carriage 113 and engaged with the lead screw 115. A plate spring 118 ensures the engagement of the lead screw 115 and the needle 117 and prevents the carriage 113 from rotating about the guide bar 114.

When the lead screw 115 is rotated by the step motor 116, the carriage 113 is moved along the guide bar 114 through the action of the needle 117 so that the magnetic head 112 performs tracking in the radial direction of the magnetic disk.

Figure 12:
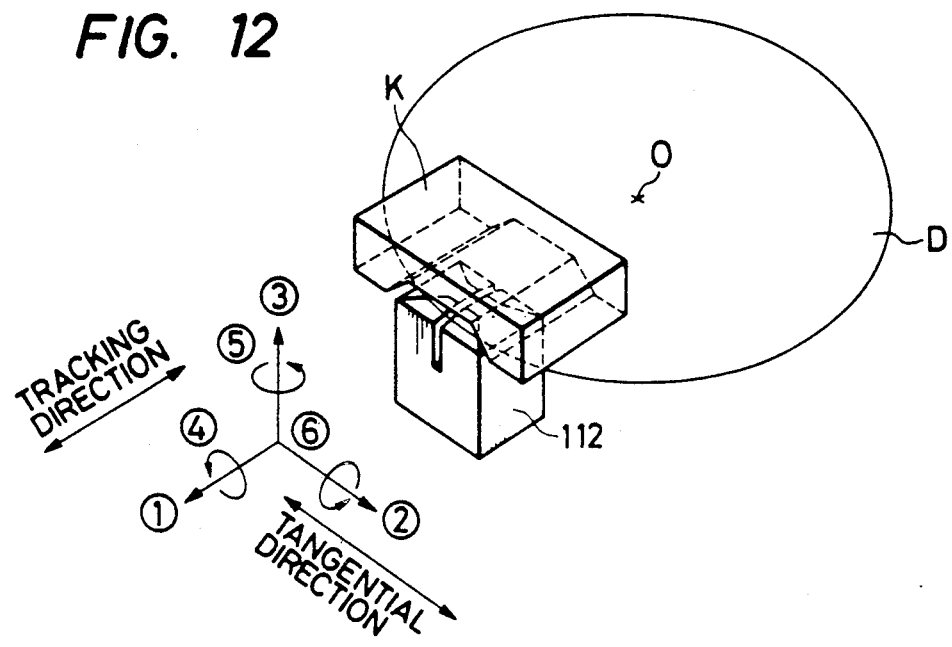
FIG. 12 shows a perspective view for describing the directions of adjustment of the magnetic head according to the second embodiment.

Since the magnetic head 112 can be moved in six degrees ①, ②, ③, ④, ⑤, and ⑥ of freedom (six directions or six quantities) as shown in FIG. 12 (as in the first embodiment). the position of the magnetic head 112 needs to be adjusted in the directions ①, ②, ③, ④, ⑤ and ⑥ when the magnetic head is attached to the carriage 113, which is moved as described above. Shown at D, O and K in FIG. 12 are the magnetic disk, the center of gyration of the magnetic disk, and a position restrictor, between which and the magnetic head 112 the magnetic disk D is pinched.

The magnetic head adjuster is now described with reference to FIGS. 7, 8, 9, 10, and 11. A plate spring 120, to which the magnetic head 112 is secured, has four support arms 120A, 120B, 120C and 120D and a coupling portion 120E coupling the support arms to each other, so that the plate spring is shaped as H. In this embodiment, the support arms 120A, 120B, 120C and 120D extend perpendicularly to the direction of tracking of the magnetic disk by the magnetic head 112, while the coupling portion 120E extends in parallel with the direction of the tracking. The magnetic head 112 is secured on a head holder 122 secured on the plate spring 120 at the coupling portion 120E between the support arms 120C and 120D by a rivet 124. The support arms 120A, 120B, 120C and 120D have through holes at the tips of the arms. Support screws 126A, 126B, 126C and 126D are loosely inserted through the holes and engaged in an azimuth adjusting plate 130.

The spherical tip of a projection quantity adjusting screw 128 is located in contact with the end of the rivet 124 under the plate spring 120 and engaged in the azimuth adjusting plate 130 so that the entire plate spring 120 to which the magnetic head is secured is pushed up by the screw 128 through the action of the rivet 124 and the support arms 120A, 120B, 120C and 120D are located in contact with the undersides of the heads of the support screws 126A, 126B, 126C and 126D around the through holes of the support arms.

When the heights of the support screws 126A, 126B, 126C and 126D from the azimuth adjusting plate 130 are changed by rotating the support screws, the distances between the azimuth adjusting plate and the support arms, 120A, 120B, 120C and 120D of the plate spring 120 are altered. The plate spring 120 has such flexibility and elastic restoring property that the magnetic head 112 secured to the plate spring 120 is displaced when the heights of the support arms 120A, 120B, 120C and 120D are changed as described above.

The azimuth adjusting plate 130, a rightward and leftward adjusting plate 140 and the carriage 113 constitute a carrier. The azimuth adjusting plate 130 can be rotated for adjustment relative to the carriage 113, in a plane parallel with the surface of the magnetic disk. The rightward and leftward adjusting plate 140 can be straightly moved for adjustment in the tangential direction of the track of the magnetic disk. The azimuth adjusting plate 130 and the rightward and leftward adjusting plate 140 are overlaid in parallel with each other on the carriage 113.

The azimuth adjusting plate 130 is rotatably fitted on a shaft 141 (shown in FIGS. 8 and 10) erected on the rightward and leftward adjusting plate 140. The range of the rotation of the azimuth adjusting plate 130 is limited by arc-shaped slender holes 130A and 130B having their centers in the shaft 141, and by guide pins 132A and 132B inserted through the arc-shaped slender holes and screw-engaged in the rightward and leftward adjusting plate 140. The axis of the shaft 141 extends through the center of the magnetic gap 112a of the magnetic head 112 perpendicularly to the rotary surface of the magnetic disk. The tip of the shaft 141 is fitted in a shallow hole provided in the head holder 122.

Spring washers 134 are fitted between the azimuth adjusting plate 130 and the heads of the guide pins 132A and 132B to apply tightening forces to prevent the azimuth adjusting plate from separating from the rightward and leftward adjusting plate 140 and the plates 130 and 140 from unexpectedly rotating relative to each other.

The azimuth adjusting plate 130 is provided with erected portions 136A and 136B located at the right and left ends of the plate, on a straight line away from the shaft 141. A plate spring 144 is located in elastic pressure contact with the left (as to FIG. 8) erected portion 136A, while the tip of an adjusting screw 146 is located in contact with the right (as to FIG. 8) erected portion 136B. The plate spring 144 is attached to an erected portion 148A extending up from the left (as to FIG. 8) end of the rightward and leftward adjusting plate 140. The adjusting screw 146 is engaged in an erected portion 148B extending up from the right (as to FIG. 8) end of the plate 140. When the quantity of projection of the tip of the adjusting screw 146 is adjusted by rotating it, the azimuth adjusting plate 130 is rotated about the shaft 141 or nearly about the magnetic head 112 so that the rotational position of the magnetic head in the directions ⑤ in FIG. 12 is adjusted. After the adjustment, an epoxy adhesive or the like can be filled in between the adjusting screw 146 and the erected portion 136B to perform securing without affecting the quantity of the adjustment.

The rightward and leftward adjusting plate 140 has slender holes 140A and 140B extending in directions (the tangential direction of the track of the magnetic disk) perpendicular to the direction of the tracking of the magnetic disk by the magnetic head 112. Guide pine 142A and 142B are inserted through the slender holes 140A and 140B and screw-engaged in the carriage 113 so that the plate 140 can be straightly moved for adjustment in the direction ② in FIG. 12, within a range limited by the slender holes and the guide pins.

Spring washers 143 are fitted between the rightward and leftward adjusting plate 140 and the heads of the guide pins 142A and 142B to apply tightening forces to prevent the plate from separating from the carriage 113 and both the plate and the carriage from unexpectedly rotating relative to each other.

The position of the magnetic head 112 in the direction ② in FIG. 12 can be adjusted by moving the rightward and leftward adjusting plate 140 along the guide pins 142A and 142B. A conventional mechanism (not shown in the drawings) such as a screw feed mechanism may be provided to finely move the rightward and leftward adjusting plate 140.

The projecting quantity adjusting screw 128 engaged in the azimuth adjusting plate 130 is loosely fitted in the through holes of the carriage 113 and the rightward and leftward adjusting plate 140 so that the screw can be rotated by operation under the carriage and the plate. The spherical tip of the adjusting screw 128 is located in contact with the rivet 124 securing the head holder 122 to the plate spring 120. As a result, the adjusting screw 128 can be rotated to adjust the quantity of projection of the spherical tip thereof to perform the adjustment of the quantity of projection of the magnetic head 112 toward the magnetic disk in the direction ③ in FIG. 12.

As described above, the adjustment of the position of the magnetic head 112 in the direction ② is performed by adjusting the position of the rightward and leftward adjusting plate 140 relative to the carriage 113; the adjustment of the position of the magnetic head in the direction ③ is performed by rotating the projection quantity adjusting screw 128 to adjust the quantity of projection of the plate spring 120; and the adjustment of the position of the magnetic head in the direction ⑤ is performed by adjusting the quantity of projection of the adjusting screw 146. Since the rotational adjustment angle of the azimuth adjusting plate 130 per rotation of the adjusting screw 146 depends on the distance (shown in FIG. 8) between the adjusting screw and the shaft 141, the distance should be determined in consideration of the angle.

The adjustment of the position of the magnetic head 112 in the direction ④ (sideward inclination) and that of the position thereof in the direction ⑥ (forward or backward inclination). which are features of the present invention, are performed by adjusting the heights of the engagement of the support screws 126A, 126B, 126C and 126D in the azimuth adjusting plate 130. When the heights of the support screws 126B (126A) and 126C (126D) relative to the azimuth adjusting plate 130 are changed (refer to FIG. 9). the distances between the plate and the tips of the support arms 120B (120A) and 120C (120D) are altered to elastically deform the plate spring 120 to move the magnetic head 112 in the direction ④ to adjust the sideward inclination thereof. When the heights of the support screws 126D (126A) and 126C (126B) relative to the azimuth adjusting plate 130 are changed (refer to FIGS. 10 and 11). the heights of the support arms 120D (120A) and 120C (120B) relative to the plate 130 are altered to elastically deform the plate spring 120 to move the magnetic head 112 in the direction ④ to adjust the sideward inclination thereof.

As described above, the sideward inclination and forward or backward inclination of the magnetic head 112 are adjusted by adjusting the heights of the three or four support arms of the plate spring 120 of flexibility and elastic restoring property in the magnetic head adjuster provided also in accordance with the second embodiment. For that reason, the inclination of the plate spring is smaller than the movement of the support screws 122A, 1212B, 122C and 122D so that the position of the magnetic head 112 can be finely adjusted.

Since the plate spring 120 and the azimuth adjusting plate 130 are fitted on the shaft 141 planted in the rightward and leftward adjusting plate 140 and extending coaxially with the magnetic head 112 and are moved up and down, swung or rotated about the shaft 141 in the second embodiment of the present invention, the positional relation between the magnetic head 112 and the plate 130 and that between the magnetic head and the plate 140 and not changed when the height, sideward inclination and forward or backward inclination of the magnetic head are adjusted. For that reason, the plates 130 and 140 do not need to be readjusted after the adjustment of the height, sideward inclination and forward or backward inclination of the magnetic head 112.

In a magnetic head adjuster provided in accordance with the present invention, a magnetic head is secured to a plate spring having at lest three support arms supported on a carrier so that the heights of the arms can be adjusted; and the carrier comprises members which can be mutually independently subjected to rotational adjustment in a plane parallel with the surface of a magnetic disk and to straight motion adjustment in the tangential direction of the track of the magnetic disk. As a result, the sideward inclination and forward or backward inclination of the magnetic head, which would be most difficult to adjust all the adjusted quantities thereof, can be finely and easily adjusted.

What is claimed is:

1. A magnetic head adjuster, comprising:
   a magnetic head;
   a plate member; and
   a plate spring having at least three arms, said magnetic head being fixed to a predetermined position of said plate spring;
   wherein each arm is supported on said plate member such that a height of each of said arms away from said plate member is adjustable.

2. A magnetic head adjuster for adjusting the positional relationship between a magnetic media and a magnetic head, comprising: a plate spring having at least three arms, said magnetic head being fixed to a predetermined position of said plate spring such that the attitudinal orientation of said magnetic head depends upon the positioning of the arms and flexural characteristics of said plate spring; and carrier means including a carrier body and means for supporting said plate spring above said carrier body such that the distance between said carrier body and each of said arms can be adjusted.

* * * * *